UNITED STATES PATENT OFFICE.

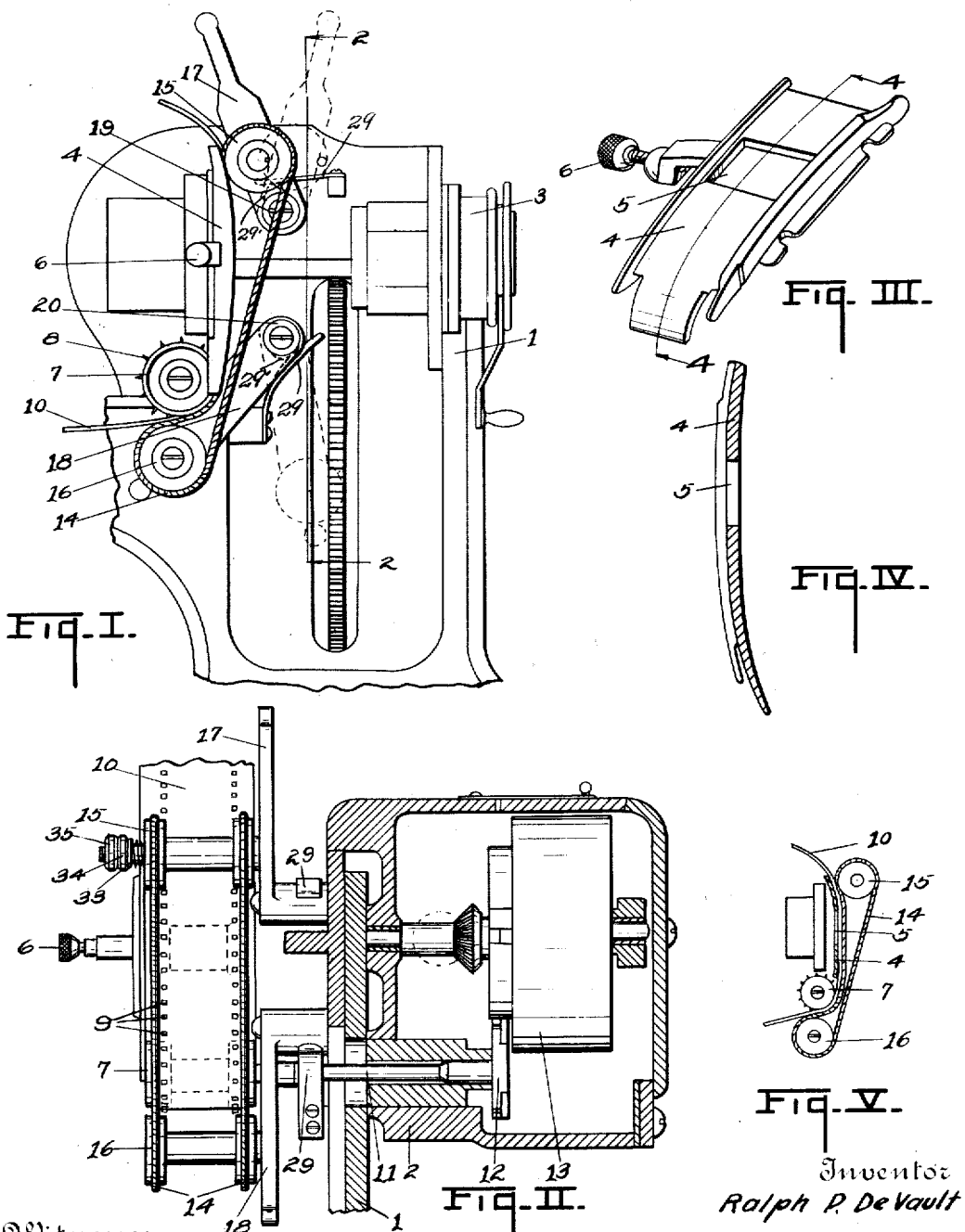

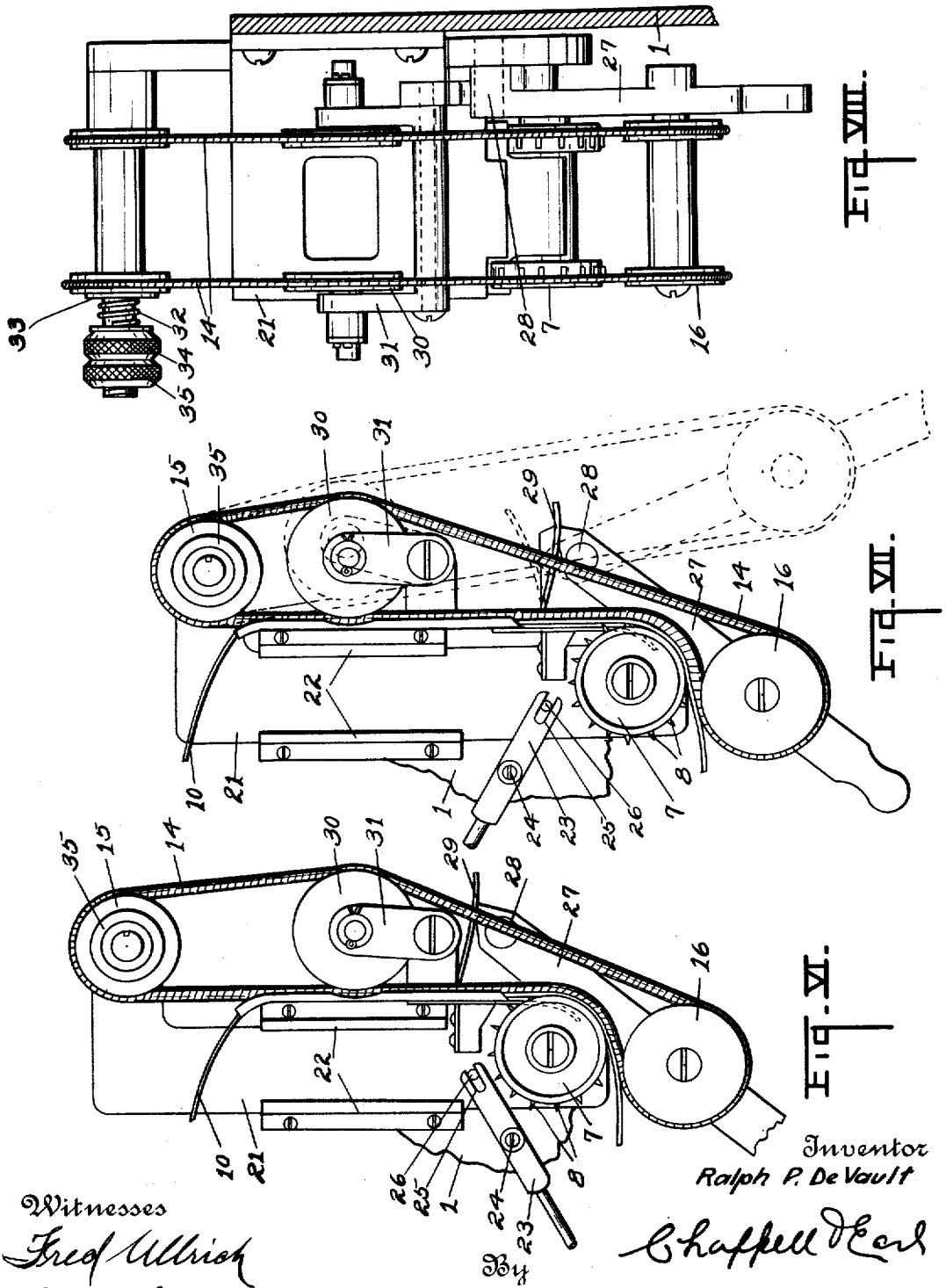

RALPH P. DE VAULT, OF BATTLE CREEK, MICHIGAN.

MOTION-PICTURE APPARATUS.

1,362,985.  Specification of Letters Patent.  Patented Dec. 21, 1920.

Original application filed May 19, 1919, Serial No. 298,013. Divided and this application filed November 4, 1919. Serial No. 335,665.

*To all whom it may concern:*

Be it known that I, RALPH P. DE VAULT, a citizen of the United States, residing at Battle Creek, county of Calhoun, State of Michigan, have invented certain new and useful Improvements in Motion-Picture Apparatus, of which the following is a specification.

This invention relates to improvements in motion picture apparatus.

My present application is a division of my application for Letters Patent, filed May 19, 1919, Serial No. 298,013.

The main objects of this invention are:

First, to provide in a motion picture apparatus an improved film driving and supporting means.

Second, to provide in a motion picture apparatus a means for controlling the film as it is moved intermittently, stopping it and holding it steady at the instant the driving sprocket stops, and at the same time allowing it to move freely when the sprocket starts.

Third, to provide in a motion picture apparatus an improved film driving means having these advantages in which the wear on the film is minimized.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation of a structure embodying the features of my invention, parts being shown mainly in conventional form and parts being broken away.

Fig. II is a detail view mainly in vertical section on a line corresponding to line 2—2 of Fig. I.

Fig. III is a front perspective view of the aperture gate or picture framing plate.

Fig. IV is a longitudinal section of the aperture gate on a line corresponding to line 4—4 of Fig. III.

Fig. V is a detail view partially in section showing details of the means for supporting and driving the film.

Fig. VI is a detail elevation of an embodiment of my improvements as adapted to another type of moving picture machine.

Fig. VII is a view corresponding to Fig. VI, showing parts in another adjustment or position.

Fig. VIII is a detail front view of the structure shown in Figs. VI and VII.

In the drawing similar reference characters refer to similar parts throughout the several views, and the sectional views are taken looking in the direction of the little arrows at the ends of the section lines.

Referring to the drawing, 1 represents the frame of a moving picture machine, 2 the gear box or housing for the film driving gearing and 3 the lens box. The details of the shutter are not illustrated as they form no part of this invention.

The film gate 4 has a framing aperture 5. The film gate is secured at the rear of the lens box by means of set screw 6. The film casing and support are not illustrated as such parts form no part of this invention.

The film sprocket 7 is disposed at the rear side of the aperture gate and is provided with teeth 8 to engage the perforations 9 of the film 10 which is of a well-known type.

The spindle 11 of the film sprocket is provided with the driven star wheel coacting with the "Geneva" stop driving member 13, thus providing a step by step driving means for the film. This driving means is described in detail and is the subject matter of the claims of my said application for Letters Patent and is not, therefore, described in detail herein.

My improvements of this application are, however, of particular value for use in connection with such driving means as the film is instantly stopped and started with the driving sprocket and held during the periods of rest.

I provide a pair of resilient belts 14 preferably formed of coiled springs. These belts are supported by pulleys 15 and 16 disposed at the ends of the gate, the lower pulley 16 being disposed below the film driving sprocket 7.

The supports 17 and 18 for these pulleys are pivoted at 19 and 20 respectively so that they may be swung away from the film, their released position being indicated by dotted lines in Fig. I. The supports are held in their released or operative position by means of the springs 29 which engage the eccentric or boss like portions 29' on the supports so that the springs engaging opposite sides of either eccentrics or bosses hold the supports in position.

These belts are supported by the pulleys so that their rear reaches yieldingly hold the film against the aperture gate and against the film sprocket as the film travels across the same. The belts are driven by their engagement with the film sprocket so that their speed is the same as the speed of the film and so there is no surface friction of the belts on the film, and the film is fed so that the wear of the sprocket therein is nominal, thus greatly increasing the life of the film.

By this arrangement of parts, the film is held so that it may be fed step by step and very rapidly and at the same time is supported so that it does not flutter and is stopped instantly when the driving sprocket stops and is not injured by this rapid feeding.

In motion picture machines of this type it is customary to cut off the light during movement of the film and this interruption of the light is the cause of objectionable flicker. It is customary to provide a shutter with interrupting parts causing further interruption of the light while the film is at rest and while this reduces the pronounced flicker it also reduces the illumination upon the screen.

My improved film feeding means is such that the interruption can be eliminated and reduced in length thereby securing more illumination upon the screen and also better results in that the flicker is substantially eliminated.

In the modification illustrated in Figs. VI, VII and VIII, I show an adaptation of my improvements to a machine of the type in which the film driving parts are adjustable to frame the picture, the aperture gate and film driving sprockets being mounted on a frame 21 supported in slides 22 for vertical adjustment. The adjustment is accomplished by means of a lever 23 which is pivoted at 24 on the main frame 1 and slotted at 25 to engage a pin 26 on the frame 21. The film sprocket 7 is mounted on this frame as is also the upper pulley 15 for the belts 14.

The lower pulley 16 is mounted on a support 27 which is pivoted at 28 on the frame 21. The spring 29 holds this support in its operative and inoperative positions, the upper end of the support being tapered to coact with the spring to secure this result. Additional pulleys 30 carried by the links or rocker 31 are arranged between the reaches of the belts in the plane of the gate aperture so as to more firmly press the inner reaches of the belt at this point. The resiliency of the tension of the springs of which the belts are formed accomplish this.

The upper pulley 15 is provided with a friction means to prevent over-running of the belts consisting of the spring 32 which presses the friction disk 33 against the end of the pulley.

Adjustable and lock nuts 34 and 35 are provided for adjusting the tension of the spring and thereby regulating the friction.

I have illustrated and described my invention in these two embodiments in order to show the adaptability or application thereof. I have not attempted to illustrate or describe other modifications and adaptations which I contemplate and which might be desirable to adapt my improvements to certain types of machines as I believe the disclosure made will enable those skilled in the art to which my invention relates to embody or adapt the same as may be desired.

Having thus described my invention, what I claim as new and desire to secure by Letters Patent is:

1. In a motion picture apparatus of the class described, comprising an intermittently driven film, the combination of an aperture gate, a driving means for said film comprising a film sprocket disposed at the lower end of the gate, a pair of belts formed of coiled springs, pulleys for said belts disposed at the ends of said gate, the lower pulleys being disposed below said film sprocket so that the rear reaches of said belts yieldingly hold the film against the gate and the film sprocket as it travels over the same, said belts being driven by said film sprocket.

2. In a motion picture apparatus of the class described, comprising an intermittently driven film, the combination of an aperture gate, a driving means for said film comprising a film sprocket disposed at the lower end of the gate, a pair of belts formed of coiled springs, pulleys for said belts disposed at the ends of said gate, the lower pulleys being disposed below said film sprocket so that the rear reaches of said belts yieldingly hold the film against the gate and the film sprocket as it travels over the same, said belts being driven by said film sprocket, pivoted supports for said pulleys, and springs for holding said supports in their operative positions.

3. In a motion picture apparatus of the class described, comprising an intermittently driven film, the combination of an aperture gate, a driving means for said film comprising a film sprocket, a pair of belts formed of coiled springs, pulleys for said belts disposed to yieldingly hold the film against the gate and the film sprocket as it travels over the same, said belts being driven by said film sprocket, pivoted supports for said pulleys, and springs for holding said supports in their operative positions.

4. In a motion picture apparatus of the class described, comprising an intermittently driven film, the combination of an aperture gate, a driving means for said film comprising a film sprocket, a pair of belts formed of coiled springs, pulleys for said belts disposed to yieldingly hold the film against the gate and the film sprocket as it travels over the same.

5. In a motion picture apparatus of the class described, comprising an intermittently driven film, the combination of an aperture gate, a driving means for said film comprising a film sprocket disposed at the lower end of the gate, a resilient belt, pulleys for said belt disposed so that the belt engages the film as it travels across the gate and over the film sprocket, pivoted supports for said pulleys, and springs for holding said supports in their operative positions.

6. In a motion picture apparatus of the class described, comprising an intermittently driven film, the combination of an aperture gate, a driving means for said film comprising a film sprocket, a resilient belt, pulleys for said belt disposed so that the belt engages the film as it travels across the gate and over the film sprocket, said belt being driven by said film sprocket.

In witness whereof, I have hereunto set my hand and seal in the presence of two witnesses.

RALPH P. DE VAULT. [L. S.]

Witnesses:
H. W. HERRELL,
H. M. BABCOCK.